US008875740B2

(12) United States Patent
Baltes

(10) Patent No.: US 8,875,740 B2
(45) Date of Patent: Nov. 4, 2014

(54) HYDRAULIC ACCUMULATOR, IN PARTICULAR BELLOWS ACCUMULATOR

(75) Inventor: Herbert Baltes, Losheim (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 353 days.

(21) Appl. No.: 12/998,284

(22) PCT Filed: Nov. 4, 2009

(86) PCT No.: PCT/EP2009/007881
§ 371 (c)(1),
(2), (4) Date: Apr. 5, 2011

(87) PCT Pub. No.: WO2010/066321
PCT Pub. Date: Jun. 17, 2010

(65) Prior Publication Data

US 2011/0192482 A1 Aug. 11, 2011

(30) Foreign Application Priority Data

Dec. 9, 2008 (DE) ........................ 10-2008-061-221

(51) Int. Cl.
*F16L 55/04* (2006.01)
*F15B 1/10* (2006.01)

(52) U.S. Cl.
CPC ........... *F15B 1/103* (2013.01); *F15B 2201/205* (2013.01); *F15B 2201/3152* (2013.01)
USPC .................................. 138/30; 138/26; 138/31

(58) Field of Classification Search
CPC .................. F15B 2201/205; F15B 2201/3153
USPC ............ 138/126, 127, 128, 130, 131, 26, 27, 138/28, 29, 30, 31
See application file for complete search history.

(56) References Cited

U.S. PATENT DOCUMENTS

| | | | | |
|---|---|---|---|---|
| 2,876,799 A | * | 3/1959 | Mercier | 138/31 |
| 3,028,881 A | * | 4/1962 | Koomey et al. | 138/30 |
| 3,406,722 A | * | 10/1968 | Ruth | 138/30 |
| 4,166,478 A | * | 9/1979 | Sugimura et al. | 138/30 |

(Continued)

FOREIGN PATENT DOCUMENTS

| | | |
|---|---|---|
| DE | 100 09 865 | 9/2001 |
| DE | 103 46 878 | 6/2004 |

(Continued)

*Primary Examiner* — Daniel R Shearer
(74) *Attorney, Agent, or Firm* — Roylance, Abrams, Berdo & Goodman LLP

(57) ABSTRACT

A bellows accumulator has a bellows (13) serving as a movable separating element between a gas side (11) and a fluid side (21). At the movable bellows end during expansion and contraction in the accumulator housing defining a longitudinal axis (9), a closure body (25) closes off the interior space (33) of the bellows (13) in a fluid-tight manner. At its other bellows end (27), the bellows is immovably fixed to the accumulator housing (1). The immovable bellows end (27) is fixed to an end body (31) fixed to the housing, which end body (31) is in the form of a disk with region (37) projecting axially into the interior (33) of the bellows (13) from the main plane (35) of the disk. At least one fluid passage (41, 43) is formed on the projecting region (37), which fluid passage (41, 43) connects the interior space (33) associated with the fluid side (21) to a fluid connection (17) of the accumulator housing (1).

9 Claims, 4 Drawing Sheets

(56) References Cited

U.S. PATENT DOCUMENTS

| | | | | |
|---|---|---|---|---|
| 4,448,217 | A * | 5/1984 | Mercier | 138/30 |
| 4,562,036 | A * | 12/1985 | Shin et al. | 376/283 |
| 4,610,369 | A * | 9/1986 | Mercier | 220/721 |
| 4,628,964 | A * | 12/1986 | Sugimura et al. | 138/30 |
| 4,638,838 | A * | 1/1987 | Richard et al. | 138/30 |
| 4,997,009 | A * | 3/1991 | Niikura et al. | 138/30 |
| 5,505,228 | A * | 4/1996 | Summerfield | 138/30 |
| 5,771,936 | A * | 6/1998 | Sasaki et al. | 138/31 |
| 5,924,196 | A * | 7/1999 | Sasaki et al. | 29/890.06 |
| 6,056,013 | A * | 5/2000 | Sasaki et al. | 138/31 |
| 6,189,572 | B1 * | 2/2001 | Ruffer et al. | 138/30 |
| 6,298,877 | B1 * | 10/2001 | Inuki et al. | 137/625.11 |
| 6,494,545 | B2 * | 12/2002 | Nakamura et al. | 303/87 |
| 6,789,576 | B2 * | 9/2004 | Umetsu et al. | 138/30 |
| 6,810,915 | B2 * | 11/2004 | Umetsu et al. | 138/31 |
| 6,923,215 | B2 * | 8/2005 | Weber | 138/31 |
| 7,013,923 | B2 * | 3/2006 | Suzuki | 138/30 |
| 7,152,931 | B2 * | 12/2006 | Suzuki et al. | 303/87 |
| 7,325,571 | B2 * | 2/2008 | Shimbori et al. | 138/30 |
| 8,096,324 | B2 * | 1/2012 | Nakaoka et al. | 138/31 |
| 2001/0037834 | A1 * | 11/2001 | Shimbori et al. | 138/31 |
| 2002/0180260 | A1 * | 12/2002 | Mohr | 303/87 |
| 2003/0075225 | A1 * | 4/2003 | Dinkel et al. | 138/31 |
| 2003/0089410 | A1 * | 5/2003 | Young | 138/30 |
| 2003/0111124 | A1 * | 6/2003 | Gray, Jr. | 138/30 |
| 2003/0178076 | A1 * | 9/2003 | Suzuki et al. | 138/30 |
| 2004/0250866 | A1 * | 12/2004 | Bartsch et al. | 138/30 |
| 2005/0028879 | A1 * | 2/2005 | Suzuki | 138/26 |
| 2005/0061379 | A1 * | 3/2005 | Mori et al. | 138/31 |
| 2007/0102052 | A1 * | 5/2007 | Yoshihara et al. | 138/30 |
| 2007/0181199 | A1 * | 8/2007 | Weber | 138/31 |
| 2009/0133768 | A1 * | 5/2009 | Miyake et al. | 138/30 |
| 2009/0205731 | A1 * | 8/2009 | Weber | 138/31 |
| 2009/0293977 | A1 * | 12/2009 | Lauterbach | 138/31 |
| 2009/0293978 | A1 * | 12/2009 | Lauterbach | 138/31 |
| 2010/0050622 | A1 * | 3/2010 | Stroganov | 60/413 |
| 2010/0186843 | A1 * | 7/2010 | Wellner et al. | 138/30 |
| 2010/0206389 | A1 * | 8/2010 | Kennedy et al. | 137/14 |
| 2011/0023977 | A1 * | 2/2011 | Fong et al. | 137/340 |
| 2011/0226370 | A1 * | 9/2011 | Arikawa et al. | 138/30 |

FOREIGN PATENT DOCUMENTS

| | | |
|---|---|---|
| DE | 103 07 129 | 9/2004 |
| EP | 1 323 928 | 7/2003 |
| EP | 1 052 412 | 3/2005 |
| JP | 60 143201 | 7/1985 |
| JP | 2001 124001 | 5/2001 |
| JP | 2001 146901 | 5/2001 |
| JP | 2005 240834 | 9/2005 |

* cited by examiner

HYDRAULIC ACCUMULATOR, IN PARTICULAR BELLOWS ACCUMULATOR

FIELD OF THE INVENTION

The invention relates to a hydraulic accumulator, in particular in the form of a bellows accumulator, in which the bellows serves as a movable separating element between a gas side and a fluid side and has a closure body closing off the interior space of the bellows in a fluid-tight manner on that end of the bellows that is capable of moving in the axial direction during expansion and contraction in the accumulator housing defining a longitudinal axis. The other bellows end of the bellows is secured to be immovable relative to the accumulator housing.

BACKGROUND OF THE INVENTION

Hydraulic accumulators comprising a bellows that serves as an movable separating element are known and used in a plurality of technical fields, for example, in hydraulic brake systems for vehicles and in various kinds of industrial hydraulic systems. EP 1 052 412 A2, for example, discloses a bellows accumulator with a metal bellows that serves as a movable separating element between a gas side and a fluid side.

In hydraulic accumulators of this type, the bellows represents the element with the highest stress and the component that is critical to operational safety. While the risk of damage is rather low when the bellows is extended so that the folds of the bellows that have approached one another are moved away from each other, compressive strain may occur when the bellows are completely contracted so that the adjacent folds of the bellows are compressed. Such a risk exists especially if total contraction of the bellows occurs suddenly in operation.

SUMMARY OF THE INVENTION

An object of the invention is to provide an improved hydraulic accumulator in the form of a bellows accumulator that effectively avoids the risk of the bellows being damaged in operation.

The object of the invention is basically achieved by a hydraulic accumulator where the immovable end of the bellows has an end body that forms not only the fluid connection between the interior space of the bellows associated with the fluid side and a fluid connection of the accumulator housing, but this end body also has a region that projects axially into the interior of the bellows. In this way, the end body with its projecting region can form, as an additional function, an end or safety stop for the closure body of the movable bellows end that comes to rest against the projecting region during contraction of the bellows. The axial height of the elevation is chosen such that the closure body of the movable end of the bellows end comes to rest against the projecting region of the end body during contraction before the adjacent folds of the bellows are compressed with one another. As a result, increased operational safety is achieved in long term operation.

In especially advantageous embodiments, the projecting region in the interior of the bellows defines a central plane that extends perpendicularly to the longitudinal axis. The result of this arrangement is a flat safety stop with a large surface against which the closure body can rest so as to be tilt proof.

In especially advantageous embodiments, the central plane in relation to the longitudinal axis is defined concentrically and at the edge by an inclined plane sloping downward to the main plane. The fluid passages are passages that are formed at least in the inclined plane and that slope downward in the direction of the longitudinal axis. This configuration of the fluid passages offers the additional advantage that these passages may serve as the flushing ports, because they extend into the bellows interior at the slope between the projecting central part and the bellows interior. During contraction of the bellows, the dirt particles that may have collected in the annular space between the inclined plane and the bellows interior are flushed out of the flushing ports.

It may be advantageous to have, in addition to the downward sloping passages, additional axial passages in the axially projecting region of the end body as the fluid passages. As a result of the additional axial passages the flow cross section between the interior space of the bellows and the fluid connection of the accumulator housing is significantly enlarged.

Advantageously the downward sloping passages can be equidistant from each other on the inclined plane. The axial passages can be arranged in circular rings that are concentric with the longitudinal axis in the axially projecting region.

As an alternative, the fluid passages can be arranged such that the region projecting into the interior of the bellows is connected to the central plane at the edge regions of the central plane by connecting parts that slope downward in the direction of the main plane. The fluid passages are formed by intermediate spaces between the connecting parts. In contrast to the formation of downward sloping passages, for example, by introducing oblique drill holes, the exemplary embodiments in which the central plane is connected to the other part of the interior body only at individual edge regions, are characterized by their extreme ease of production and, thus, low manufacturing costs.

The pertinent arrangement can be configured such that the central plane has a square shape and that each corner of the square has a connecting part.

In preferred embodiments, the accumulator housing has a cup-like, hollow cylindrical main part and a housing closure part, which closes the opening of the cup and which is welded to the main part along a weld line. The end body of the bellows is secured on the periphery of the accumulator housing in the region of the weld line. This feature permits an efficient production process in that both the end body is secured and the accumulator housing is closed in one combined welding step.

The side of the end body opposite the projecting region can form an annular area that extends into a radial plane and that surrounds a depression concentric with the axis and defined by the wall of the axially projecting region.

If, in this case, the annular area of the end body surrounds the coaxial fluid connection in the housing closure part in alignment with the radially inner edge of the annular area and the entrance of the depression, the result is advantageously an uninterrupted flow path from the exterior of the accumulator housing to the fluid passages in the end body.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
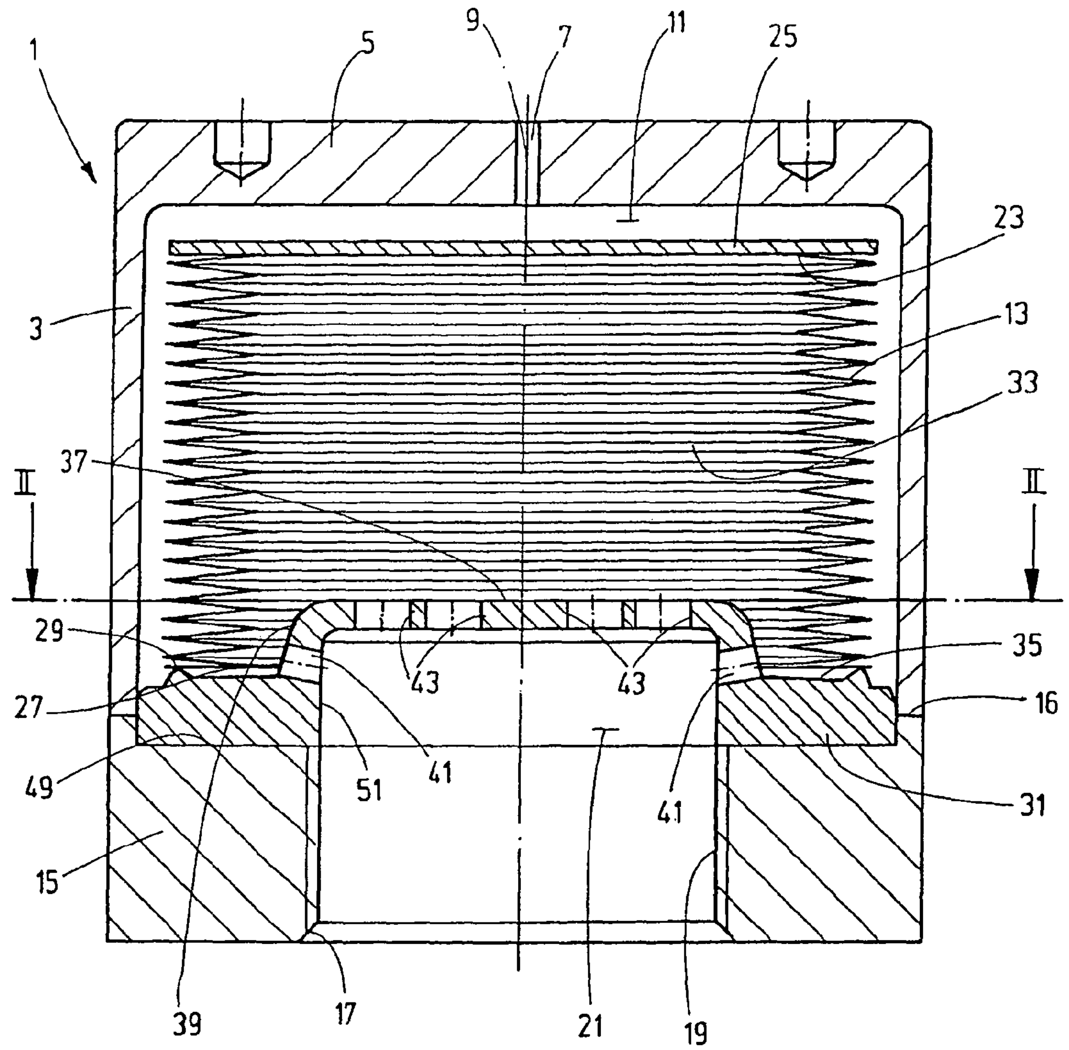
FIG. 1 is a schematically simplified, side elevational view in section, drawn approximately in natural size, of a hydraulic accumulator according to a first exemplary embodiment of the invention.

In the drawing, the invention is described by one exemplary embodiment in the form of a pulsation damper. An accumulator housing 1 has a housing main part 3 in the form of a circular cylindrical cup with an end 5 located at the top in the drawing and closed except for a charging port 7. Port 7 is in alignment with the longitudinal axis 9 of the housing. In the drawing of FIG. 1, the charging port 7 is still open. The gas side 11, which borders on the charging port 7 and which is located on the outside of a metal bellows 13, has not yet been filled with a working gas. The housing 1 is closed by a housing closure part 15 on the end that is located at the bottom in FIG. 1 and is opposite the charging port 7. This housing closure part is sealingly welded to the housing main part 3 along a weld line 16. In the closure part 15, a fluid inlet 17, which is concentric with the axis 9 and has an inside thread 19 for a fluid connection, is concentric with the axis 9.

In the interior of the accumulator housing 1, a metal bellows 13 forms a movable separating element between the gas side 11 and the fluid side 21, bordering on the fluid inlet 17. A closure body 25 closes off the metal bellows 13 in a fluid-tight manner at its bellows end 23 that is located at the top. This closure body is formed by a flat, thin metal plate that is welded to the last bellows fold at the bellows end 23. The other bellows end 27, the immovable bellows end, located at the bottom in FIG. 1, is welded with the bottommost bellows fold in a fluid-tight manner to a weld region 29 on a metallic end body 31. End body 31 is welded to the accumulator housing 1 along the weld line 16 between the housing main part 3 and the housing closure part 15.

As stated, in the state depicted in FIG. 1, the gas side 11 has not been provided yet with a working gas under a pre-charge pressure, so that the bellows 13 is in the extended state, where the closure body 25 is in proximity to the upper end 5 of the accumulator housing 1. When the pressure prevails on the gas side 11, a fill with the working gas, such as $N_2$, and alternating fluid pressure on the fluid side 21 cause the closure body 25 to move axially. When the hydraulic accumulator is used as a pulsation damper, in the course of which the fluid side 21 is in fluid connection with a compressed fluid, in particular a hydraulic fluid, a fuel, or lubricant by the fluid inlet 17. In order to smooth any pressure surges that might occur, it has been proven to be advantageous for the gas side 11 to have not only a fill with the working gas, but also to have a predefined fraction of a fluid. In this case, a combination of nitrogen gas as the working gas and ethyl alcohol as the fluid on the gas side 11 of the accumulator has been proven to be especially advantageous as the fill. In operation, the fluid between the folds and deflections of the bellows 13 can form a damping support medium, which can support, as the back support, the folded wall sections of the bellows 13 on the fluid. As a result of the support, the service life of the bellows 13 is extended. Consequently, the functional reliability is increased. This aspect applies especially to sudden pulsations and rapid pressure surges.

The end body 31, which is provided on the immovable bellows end 27, forms fluid passages as a connection between the interior space 33 of the bellows 13 associated with the fluid side 21 and the fluid inlet. The end body 31 has the form of a round disk that defines a plurality of radial planes, that is, an outer plane 35, which is referred to herein as the main plane and which borders on the peripheral edge, and a plane 37, which is centrally located in relation to the longitudinal axis 9 and which forms a region which projects axially into the interior space 33 of the bellows 13, on the end body 31. The plane 35, which is referred to herein as the main plane, is located at the edge of the weld region 29, which projects slightly beyond this plane 35 and at which the immovable bellows end 27 is secured.

Figure 2:
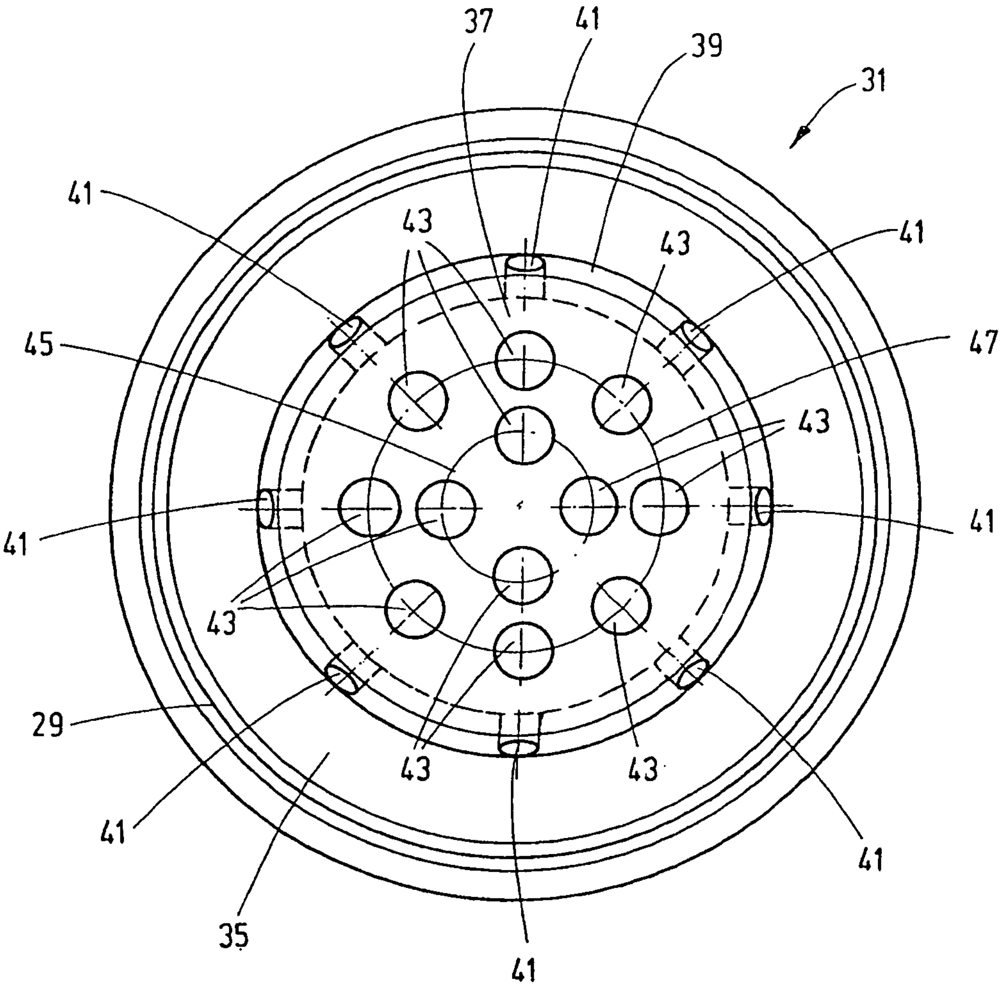
FIG. 2 is a top plan view of the end body only of the bellows of the exemplary embodiment shown in FIG. 1 as viewed in the direction of line II-II in FIG. 1.

The central plane 37, which forms the projecting region, is defined at the edge by an inclined plane 39 at an acute angle to the longitudinal axis 9. The inclined plane 39 has oblique drill holes 41, which slope downward in the direction of and at an acute angle relative to the longitudinal axis 9 and are arranged so as to be uniformly distributed around the periphery of the inclined plane 39. The oblique drill holes form a first group of fluid passages between the fluid inlet 17 and the interior space 33 of the bellows 13. A second group of fluid passages is constructed in the form of axial drill holes 43 in the projecting region defined by the central plane 37. As shown in FIG. 2, the axial drill holes 43 are arranged so as to be uniformly distributed along two concentric circular lines 45 and 47.

The side of the end body 31 that is opposite the planes 37 and 35 forms an annular area 49 which extends into a radial plane in the end body 31. This annular area surrounds a depression 51, which is concentric with the axis 9 and which is formed by the inner wall of the region. This inner wall projects into the interior space 33 of the bellows 13 and is defined by the central plane 37. In the present exemplary embodiment, the radial inner edge of the annular area 49 and, with it, the opening edge of the depression 51 for opening the fluid inlet 17 are in alignment. An uninterrupted flow path from the fluid inlet 17 into the depression 51 of the end body 31 is then formed. The fluid passages formed in the end body 31, that is, the oblique drill holes 41 in the inclined plane 39 as well as the axial drill holes 43 in the projecting region, continue the flow path into the interior space 33.

The plane 37 of the projecting region is offset axially in relation to the main plane designated as 35 by such a distance in the interior space 33 that the plane 37 forms an end stop against which the closure body 25 rests at the movable bellows end 23 when the bellows 13 is totally contracted. The passages, formed by the oblique drill holes 41, remain open as the fluid passages, even if, when the bellows 13 is totally contracted, with the closure body 25 resting flush on the plane 37 and closing the axial drill holes 43. Even while the end body 31 exercises its safety or stop function, the interior space 33 of the bellows 13 remains with the remaining residual fluid volume connected to the fluid inlet 17. Owing to the arrangement of the oblique drill holes 41, which extend into the inclined plane 39, these oblique drill holes 41 serve additionally as flushing ports, through which the dirt particles accumulated at the immovable bellows end 27 in the region between the inclined plane 39 and the bellows interior are flushed out during the axial movements. The closure body 25 carries out these axial movements in operation during contraction of the bellows 13. As stated above, the distance by which the plane 37 projects axially in relation to the immovable bellows end 27 is chosen such that when the closure body 25 rests against the plane 37, the folds of the bellows 13 are not pressed against each other. The pertinent arrangement can be configured such that a desired residual volume of fluid remains in the interior space 33 of the bellows 13.

Figure 4:
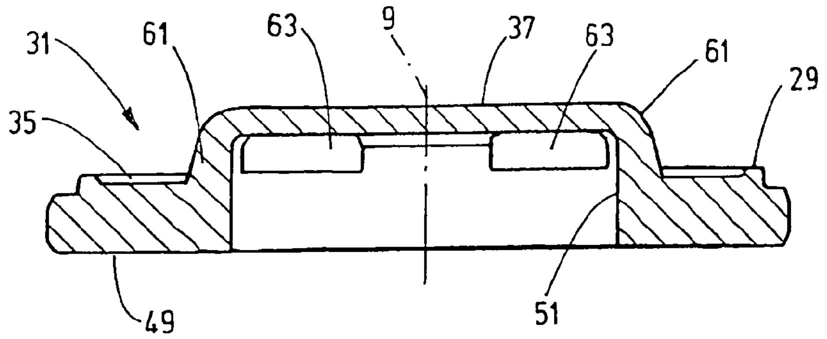
FIG. 4 is a side elevational view in section of the end body of FIG. 3, taken along line IV-IV in FIG. 3.
Figure 3:
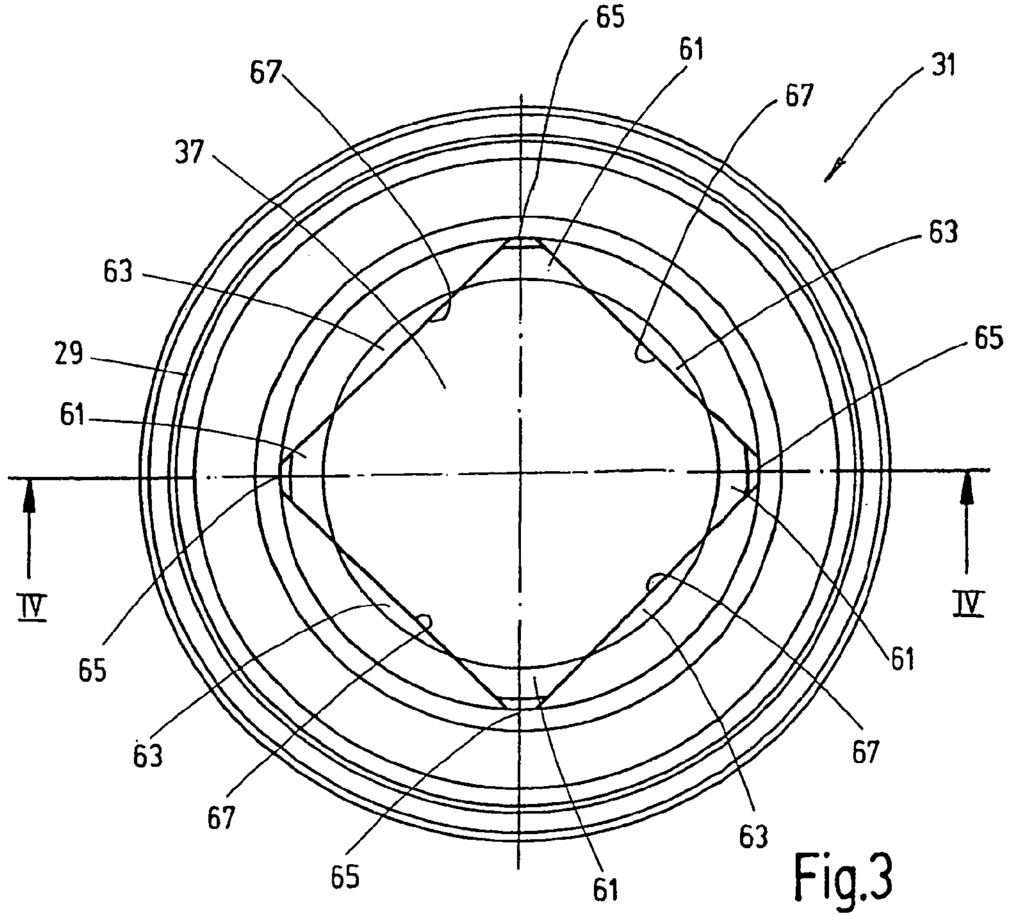
FIG. 3 is a top plan view of an end body for a hydraulic accumulator according to a second exemplary embodiment of the invention.
Figure 5:
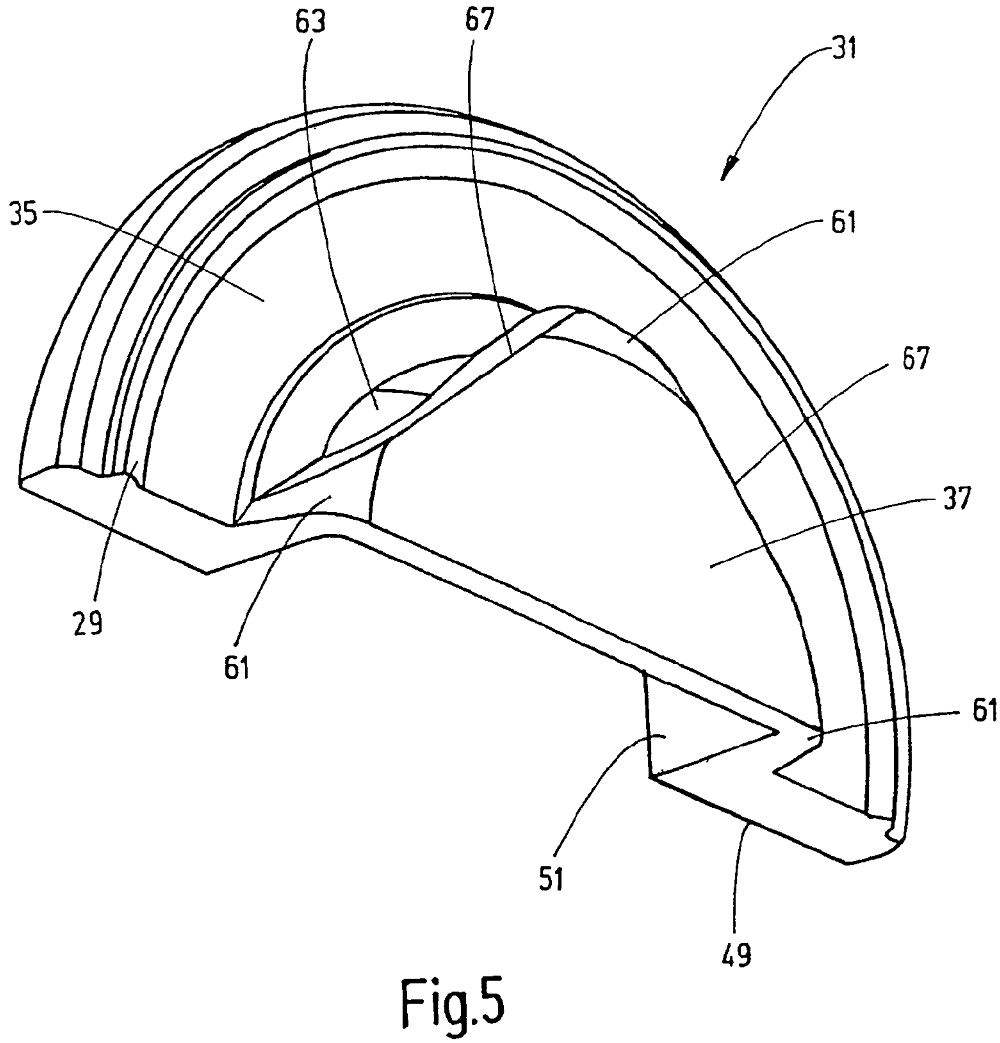
FIG. 5 is a perspective view of the end body of FIGS. 3 and 4, cut approximately in half.

FIGS. 3 to 5 depict a second exemplary embodiment, in which an end body 31 is provided in a simplified type of construction. The end body 31 of this exemplary embodiment differs from the above-described first embodiment only in the design of the region projecting into the interior 33 of the bellows 13. As in the first example, this projecting region is also formed by a plane 37 extending perpendicular to the longitudinal axis 9 as the safety end stop for the closure body 25 of the bellows 13. In contrast to the first described example, the plane 37 is square in contour. Each of the corner regions has a connecting part 61, which slopes downward to the main plane 35 in a curved inclined course. An intermediate space 63 is then formed between each of the adjacent corners 65. This intermediate space extends along a straight side 67 of the square, so that a fluid passage is formed on each square side 67 from the edge of the square to the opening of the depression 51. As can be seen from the drawing, this embodiment does not provide that the plane 37 has additional axial drill holes as the fluid passages. The size of the fluid passages that are formed by the intermediate spaces 63 causes the flow resistance to be low even without additional axial drill holes.

The end body 31 in the second type of construction is easy to manufacture in that in the end bodies in the form of the end body 31 from FIGS. 1 and 2 that are shaped by forming or machining processes, instead of introducing the drill holes 41 and 43 at the projecting region, straight cut outs are made. These straight cut outs run along the sides 67 and form the square shape of the plane 37 while simultaneously producing the intermediate spaces 63 as the fluid passages.

While various embodiments have been chosen to illustrate the invention, it will be understood by those skilled in the art that various changes and modifications can be made therein without departing from the scope of the invention as defined in the appended claims.

What is claimed is:

1. A hydraulic accumulator, comprising:

an accumulator housing having a gas side and fluid side therein, defining a longitudinal axis and having a fluid connection on said fluid side;

a movable bellows separating said gas side and said fluid side in said housing, said bellows having a closure body at a first end of said bellows closing an interior space of said bellows fluid-tight and defining said fluid side, said first end being movable in said housing in an axial direction along said longitudinal axis between expanded and contracted positions, a second end of said bellows being secured immovably relative to said housing by being secured on an end disk rigidly mounted in said housing, said end disk having a projecting region projecting axially into said interior space of said bellows from a main plane of said end disk, said projecting region defining a central plane extending perpendicularly and concentric to said longitudinal axis, said end disk having an inclined plane extending from and sloping away from said central plane to said main plane at an acute angle relative to said longitudinal axis defining a hollow space in a form of a truncated taper, said closure body engaging said central plane in the contracted position; and first fluid passages formed in said inclined plane and sloped toward said fluid connection at an acute angle relative to said longitudinal axis to connect said interior space with said hollow space and said fluid connection.

2. A hydraulic accumulator according to claim 1 wherein second fluid passages extend axially through said central plane connecting said interior space with said hollow space.

3. A hydraulic accumulator according to claim 1 wherein said first fluid passages are arranged equidistant from one another on said inclined plane.

4. A hydraulic accumulator according to claim 2 wherein said second fluid passages are arranged in circular rings concentric to said longitudinal axis.

5. A hydraulic accumulator according to claim 1 wherein said accumulator housing comprises a cup-shaped hollow cylindrical main part and a housing closure part closing an opening of said main part and being welded to said main part along a weld line, said end disk being secured on a periphery thereof to said housing in a region of said weld line.

6. A hydraulic accumulator according to claim 1 wherein a side of said end disk opposite said projecting region has an annular area extending in a radial plane and surrounding a depression concentric with said longitudinal axis and defined by a wall of said projecting region.

7. A hydraulic accumulator according to claim 6 wherein said annular area of said end disk surrounds coaxially said fluid connection and has a radially inner edge axially aligned with a periphery of said fluid connection and an entrance to said depression.

8. A hydraulic accumulator according to claim 1 wherein said bellows is welded to said closure body at said first end and to said end disk at said second end, said bellows, said closure body and said end disk being metallic.

9. A hydraulic accumulator according to claim 1 wherein said inclined plane extends directly from said central plane.

* * * * *